(12) United States Patent
Davidson et al.

(10) Patent No.: US 11,478,870 B2
(45) Date of Patent: Oct. 25, 2022

(54) DABBING PULSED WELDING SYSTEM AND METHOD

(71) Applicant: ILLINOIS TOOL WORKS INC., Glenview, IL (US)

(72) Inventors: Robert R. Davidson, New London, WI (US); Peter Donald Mehn, Oshkosh, WI (US); Richard J. Schuh, Freedom, WI (US)

(73) Assignee: Illinois Tool Works Inc., Glenview, IL (US)

( * ) Notice: Subject to any disclaimer, the term of this patent is extended or adjusted under 35 U.S.C. 154(b) by 342 days.

(21) Appl. No.: 14/554,508

(22) Filed: Nov. 26, 2014

(65) Prior Publication Data

US 2016/0144444 A1 May 26, 2016

(51) Int. Cl.
| | |
|---|---|
| *B23K 9/09* | (2006.01) |
| *B23K 9/10* | (2006.01) |
| *B23K 9/12* | (2006.01) |
| *B23K 9/095* | (2006.01) |
| *B23K 9/173* | (2006.01) |

(52) U.S. Cl.
CPC ............. *B23K 9/092* (2013.01); *B23K 9/093* (2013.01); *B23K 9/0953* (2013.01); *B23K 9/0956* (2013.01); *B23K 9/1012* (2013.01); *B23K 9/1062* (2013.01); *B23K 9/125* (2013.01); *B23K 9/173* (2013.01)

(58) Field of Classification Search
CPC .......... B23K 9/092; B23K 9/09; B23K 9/091; B23K 9/093; B23K 9/095; B23K 9/0953; B23K 9/0956

USPC .................................................... 219/130.51
See application file for complete search history.

(56) References Cited

U.S. PATENT DOCUMENTS

| | | | |
|---|---|---|---|
| 2,365,958 | A | 12/1944 | Holslag |
| 2,416,047 | A | 2/1947 | Dolan |
| 3,288,982 | A | 11/1966 | Haruyoshi |
| | | (Continued) | |

FOREIGN PATENT DOCUMENTS

| | | |
|---|---|---|
| CA | 2072711 | 12/1992 |
| CN | 2181354 | 11/1994 |
| | (Continued) | |

OTHER PUBLICATIONS

"ALT 304," Miller—The Power of Blue, Jun. 2001.
(Continued)

*Primary Examiner* — Erin E McGrath
(74) *Attorney, Agent, or Firm* — McAndrews, Held & Malloy, Ltd.

(57) ABSTRACT

A pulsed welding regime includes a peak phase in which energy is added to an electrode and a weld puddle, and a molten ball begins to detach from the electrode, followed by a dabbing phase in which current is significantly reduced to place the ball in the weld puddle with addition of little or no energy. The resulting short circuit clears and the system proceeds to a background phase. The current in the dabbing phase is lower than the current during the background phase. The process may be specifically adapted for particular welding wires, and may be particularly well suited for use with cored wires. The dabbing phase allows for lower energy to be transferred to the sheath of such wires, and resets the arc length after each pulse cycle.

16 Claims, 10 Drawing Sheets

(56) References Cited

U.S. PATENT DOCUMENTS

| | | |
|---|---|---|
| 3,725,629 A | 4/1973 | Vickers |
| 3,809,853 A | 5/1974 | Manz |
| 3,849,871 A | 11/1974 | Kaunitz |
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |
| 4,426,565 A | 1/1984 | Rueter |
| 4,447,703 A | 5/1984 | Stol |
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,580,026 A | 4/1986 | Stol |
| 4,628,182 A | 12/1986 | Hori |
| 4,631,385 A | 12/1986 | Rothermel |
| 4,667,083 A | 5/1987 | Stol |
| 4,728,761 A | 3/1988 | Mucha |
| 4,897,523 A | 1/1990 | Parks |
| 4,950,348 A | 8/1990 | Larsen |
| 4,954,691 A | 9/1990 | Parks |
| 4,973,821 A | 11/1990 | Martin |
| 5,001,326 A | 3/1991 | Stava |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A | 1/1994 | Blankenship |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,526,561 A | 6/1996 | McGaffigan |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn |
| 5,773,799 A | 6/1998 | Maxfield |
| 5,783,799 A | 7/1998 | Geissler |
| 5,844,193 A | 12/1998 | Nomura |
| 5,963,022 A | 10/1999 | Buda |
| 5,968,587 A | 10/1999 | Frankel |
| 6,002,104 A | 12/1999 | Hsu |
| 6,008,470 A | 12/1999 | Zhang |
| 6,043,471 A | 3/2000 | Wiseman |
| 6,051,810 A | 4/2000 | Stava |
| 6,090,067 A | 7/2000 | Carter |
| 6,107,602 A | 8/2000 | Geissler |
| 6,115,273 A | 9/2000 | Geissler |
| 6,169,263 B1 | 1/2001 | Derby |
| 6,204,476 B1 | 3/2001 | Reynolds |
| 6,248,976 B1 | 6/2001 | Blankenship |
| 6,265,688 B1 | 7/2001 | Lyshkow |
| 6,278,074 B1 | 8/2001 | Morlock |
| 6,292,715 B1 | 9/2001 | Rongo |
| 6,331,694 B1 | 12/2001 | Blankenship |
| 6,359,258 B1 | 3/2002 | Blankenship |
| 6,479,792 B1 | 11/2002 | Beiermann |
| 6,486,439 B1 | 11/2002 | Spear |
| 6,515,259 B1 | 2/2003 | Hsu |
| 6,583,386 B1 | 6/2003 | Ivkovich |
| 6,596,970 B2 | 7/2003 | Blankenship |
| 6,624,388 B1 | 9/2003 | Blankenship |
| 6,642,482 B2 | 11/2003 | Rappl |
| 6,670,579 B2 | 12/2003 | Davidson |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,984,806 B2 | 1/2006 | Huismann |
| 6,995,338 B2 | 2/2006 | Hutchison |
| 7,002,103 B2 | 2/2006 | Holverson |
| 7,129,443 B2 | 10/2006 | Davidson |
| 7,145,101 B2 | 12/2006 | Tong |
| 7,244,905 B2 | 7/2007 | Das |
| 7,265,320 B2 | 9/2007 | Ou |
| 7,304,269 B2 | 12/2007 | Fulmer |
| 7,307,240 B2 | 12/2007 | Holverson |
| 7,351,933 B2 | 4/2008 | Huismann |
| 7,683,290 B2 | 3/2010 | Daniel |
| 8,203,100 B2 | 6/2012 | Ueda |
| 8,288,686 B2 | 10/2012 | Kaufman |
| 8,487,215 B2 | 7/2013 | Holverson |
| 9,403,231 B2 | 8/2016 | Hutchison |
| 9,539,662 B2 | 1/2017 | Hutchison |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Arndt |
| 2003/0058149 A1 | 3/2003 | Jayadeva |
| 2003/0111452 A1 | 6/2003 | Ihde |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |
| 2004/0238511 A1 | 12/2004 | Matus |
| 2005/0184039 A1 | 8/2005 | Stava |
| 2005/0224481 A1* | 10/2005 | Nadzam ................ B23K 9/092 |
| | | 219/130.51 |
| 2005/0269306 A1 | 12/2005 | Fulmer |
| 2006/0138115 A1* | 6/2006 | Norrish .................... B23K 9/09 |
| | | 219/137.71 |
| 2006/0163229 A1 | 7/2006 | Hutchison |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0173726 A1 | 7/2009 | Davidson |
| 2010/0059493 A1 | 3/2010 | McAninch |
| 2010/0096373 A1 | 4/2010 | Hillen |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0297658 A1 | 8/2011 | Peters |
| 2011/0248007 A1 | 10/2011 | Takeda |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1* | 4/2012 | Daniel .................... B23K 9/091 |
| | | 219/130.21 |
| 2012/0248080 A1 | 10/2012 | Hutchison |
| 2012/0291172 A1 | 11/2012 | Wills |

(56) References Cited

U.S. PATENT DOCUMENTS

| | | |
|---|---|---|
| 2012/0298642 A1 | 11/2012 | Lambert |
| 2013/0112674 A1 | 5/2013 | Mnich |
| 2013/0112676 A1 | 5/2013 | Hutchison |
| 2013/0264323 A1 | 10/2013 | Daniel |
| 2013/0270245 A1 | 10/2013 | Holverson |
| 2014/0021183 A1 | 1/2014 | Peters |
| 2014/0158669 A1 | 6/2014 | Davidson |
| 2014/0183176 A1 | 7/2014 | Hutchison |
| 2014/0217077 A1 | 8/2014 | Davidson |
| 2014/0251971 A1 | 9/2014 | Hearn |
| 2014/0263237 A1 | 9/2014 | Daniel |
| 2014/0263241 A1 | 9/2014 | Henry |
| 2014/0263243 A1 | 9/2014 | Marschke |
| 2014/0367370 A1 | 12/2014 | Hutchison |
| 2015/0001197 A1 | 1/2015 | Marschke |
| 2015/0083702 A1 | 3/2015 | Scott |
| 2015/0105898 A1 | 4/2015 | Adams |
| 2016/0074954 A1 | 3/2016 | Marschke |
| 2016/0318112 A1 | 11/2016 | Hutchison |

FOREIGN PATENT DOCUMENTS

| | | |
|---|---|---|
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 101804495 | 8/2010 |
| CN | 101862886 | 10/2010 |
| CN | 102470473 | 5/2012 |
| CN | 102554418 | 7/2012 |
| CN | 102596475 | 7/2012 |
| CN | 102770228 | 11/2012 |
| CN | 202824943 | 3/2013 |
| DE | 2501928 | 7/1976 |
| DE | 19808383 | 9/1999 |
| EP | 0194045 | 9/1986 |
| EP | 0387223 | 9/1990 |
| EP | 1232825 | 8/2002 |
| EP | 2218537 | 8/2010 |
| EP | 2286949 | 2/2011 |
| FR | 1443701 | 6/1966 |
| JP | S5719166 | 2/1982 |
| JP | S57109573 | 7/1982 |
| JP | S60108175 | 6/1985 |
| JP | S60108176 | 6/1985 |
| JP | S6471575 | 3/1989 |
| JP | H03285768 | 12/1991 |
| JP | H06277840 | 10/1994 |
| JP | H07204848 | 8/1995 |
| JP | H11156542 | 6/1999 |
| JP | 2001276971 | 10/2001 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| KR | 1020120027764 | 3/2012 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |

OTHER PUBLICATIONS

"Maxstar 200 SD, DX, and LX," Miller Electric Mfg. Co., Oct. 2003.
Bondy et al., "Graph Theory with Appliations," University of Waterloo, 1976, p. 7-8.
International Search Report from PCT application No. PCT/US2015/055040, dated Feb. 3, 2016, 11 pgs.

\* cited by examiner

DABBING PULSED WELDING SYSTEM AND METHOD

BACKGROUND

The invention relates generally to welders, and more particularly to a welder configured to perform a welding operation in which a pulsed waveform is applied to welding wire as the wire is advanced from a welding torch.

A wide range of welding systems and welding control regimes have been implemented for various purposes. In continuous welding operations, metal inert gas (MIG) techniques allow for formation of a continuing weld bead by feeding welding wire shielded by inert gas from a welding torch. Electrical power is applied to the welding wire and a circuit is completed through the workpiece to sustain an arc that melts the wire and the workpiece to form the desired weld.

Advanced forms of MIG welding are based upon generation of pulsed power in the welding power supply. That is, various pulsed regimes may be carried out in which current and/or voltage pulses are commanded by the power supply control circuitry to regulate the formation and deposition of metal droplets from the welding wire, to sustain a desired heating and cooling profile of the weld pool, to control shorting between the wire and the weld pool, and so forth.

While very effective in many applications, such pulsed regimes may be subject to drawbacks. For example, depending upon the transfer mode, the processes may either limit travel speed, create excessive spatter (requiring timely cleanup of welded workpieces), provide less than optimal penetration, or any combination of these and other effects. Moreover, certain pulsed processes, such as ones operating in a spray mode of material transfer, may run excessively hot for particular applications. Others, such as short circuit processes, may run cooler, but may again produce spatter and other unwanted weld effects.

Moreover, in certain welding situations and with certain welding electrodes, pulsed welding processes that are trained to implement cyclic short circuits between the electrode and the workpiece may add excessive energy to the weld. For example, with cored wire electrodes, the electrode may be heated by excessive current added to the wire, particularly insomuch as the weld current tends to flow through the wire sheath, which can more easily melt than solid wires. As a result, the arc may flare (grow long). However, for spanning gaps, reducing burn-through, and increasing travel speeds, it may be desirable to maintain the arc length at a minimum. Unfortunately, this causes the wire to short to the progressing weld puddle and requires additional current to clear short circuits, again leading to heating of cored wire sheaths, and causing the arc to flare.

There is a need, therefore, for improved welding strategies that allow for welding in pulsed waveform regimes while improving weld quality and flexibility.

BRIEF DESCRIPTION

The present invention provides welding systems designed to respond to such needs. In accordance with an exemplary implementation, a welding system comprises processing circuitry configured to provide a control waveform comprising a peak phase followed immediately by a dabbing phase followed by a background phase; and power conversion circuitry configured to provide welding power output based upon the control waveform.

The invention also provides methods for welding, such as, in accordance with one aspect, generating a waveform for welding power output, the waveform comprising a peak phase followed immediately by a dabbing phase followed by a background phase; and converting incoming power to welding power based upon the control waveform.

DRAWINGS

DETAILED DESCRIPTION

Figure 1:
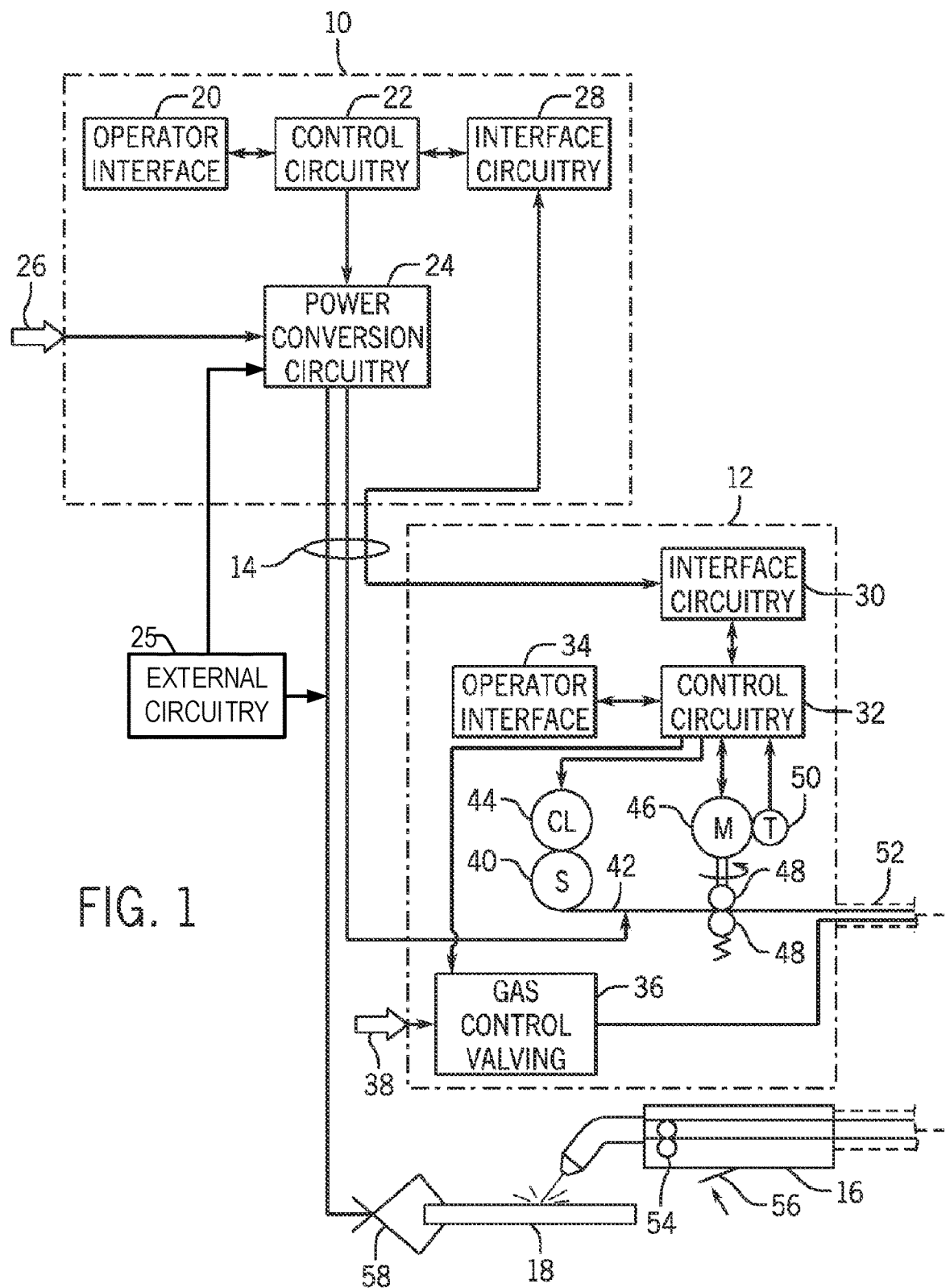
FIG. 1 is a diagrammatical representation of an exemplary MIG welding system illustrating a power supply coupled to a wire feeder for performing pulsed welding operations in accordance with aspects of the present techniques.

Turning now to the drawings, and referring first to FIG. 1, an exemplary welding system is illustrated as including a power supply 10 and a wire feeder 12 coupled to one another via conductors or conduits 14. In the illustrated embodiment the power supply 10 is separate from the wire feeder 12, such that the wire feeder may be positioned at some distance from the power supply near a welding location. However, it should be understood that the wire feeder, in some implementations, may be integral with the power supply. In such cases, the conduits 14 would be internal to the system. In embodiments in which the wire feeder is separate from the power supply, terminals are typically provided on the power supply and on the wire feeder to allow the conductors or conduits to be coupled to the systems so as to allow for power and gas to be provided to the wire feeder from the power supply, and to allow data to be exchanged between the two devices.

The system is designed to provide wire, power and shielding gas to a welding torch 16. As will be appreciated by those skilled in the art, the welding torch may be of many different types, and typically allows for the feed of a welding wire and gas to a location adjacent to a workpiece 18 where a weld is to be formed to join two or more pieces of metal. A second conductor is typically run to the welding workpiece so as to complete an electrical circuit between the power supply and the workpiece.

The system is designed to allow for data settings to be selected by the operator, particularly via an operator interface 20 provided on the power supply. The operator interface will typically be incorporated into a front faceplate of the power supply, and may allow for selection of settings such as the weld process, the type of wire to be used, voltage and current settings, and so forth. In particular, the system is designed to allow for MIG welding with various steels, aluminums, or other welding wire that is channeled through the torch. These weld settings are communicated to control circuitry 22 within the power supply. The system may be particularly adapted to implement welding regimes designed for certain electrode types, such as cored electrodes.

The control circuitry, described in greater detail below, operates to control generation of welding power output that is applied to the welding wire for carrying out the desired welding operation. In certain presently contemplated embodiments, for example, the control circuitry may be adapted to regulate a pulsed MIG welding regime that "dabs" or promotes short circuit transfer of molten metal to a progressing weld puddle without adding excessive energy to the weld or electrode. In "short circuit" modes, droplets of molten material form on the welding wire under the influence of heating by the welding arc, and these are periodically transferred to the weld pool by contact or short circuits between the wire and droplets and the weld pool. "Pulsed welding" or "pulsed MIG welding" refers to techniques in which a pulsed power waveform is generated, such as to control deposition of droplets of metal into the progressing weld puddle. In a particular embodiment of the invention, a specialized pulsed welding regime may be implemented in which pulses are generated that have characteristics of both short circuit welding and spray welding, in a type of "hybrid" transfer mode as described in U.S. patent application Ser. No. 13/655,174, entitled "Hybrid Pulsed-Short Circuit Welding Regime", filed by Hutchison et al., on Oct. 18, 2012, which is hereby incorporated by reference into the present disclosure.

The control circuitry is thus coupled to power conversion circuitry 24. This power conversion circuitry is adapted to create the output power, such as pulsed waveforms that will ultimately be applied to the welding wire at the torch. Various power conversion circuits may be employed, including choppers, boost circuitry, buck circuitry, inverters, converters, and so forth. The configuration of such circuitry may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. In some embodiments, multi-pin interfaces may be provided on both components and a multi-conductor cable run between the interface circuitry to allow for such information as wire feed speeds, processes, selected currents, voltages or power levels, and so forth to be set on either the power supply 10, the wire feeder 12, or both.

The wire feeder 12 also includes control circuitry 32 coupled to the interface circuitry 30. As described more fully below, the control circuitry 32 allows for wire feed speeds to be controlled in accordance with operator selections, and permits these settings to be fed back to the power supply via the interface circuitry. The control circuitry 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuitry 32 is also coupled to gas control valving 36 which regulates the flow of shielding gas to the torch. In general, such gas is provided at the time of welding, and may be turned on immediately preceding the weld and for a short time following the weld. The gas applied to the gas control valving 36 is typically provided in the form of pressurized bottles, as represented by reference numeral 38.

The wire feeder 12 includes components for feeding wire to the welding torch and thereby to the welding application, under the control of control circuitry 36. For example, one or more spools of welding wire 40 are housed in the wire feeder. Welding wire 42 is unspooled from the spools and is progressively fed to the torch. The spool may be associated with a clutch 44 that disengages the spool when wire is to be fed to the torch. The clutch may also be regulated to maintain a minimum friction level to avoid free spinning of the spool. A feed motor 46 is provided that engages with feed rollers 48 to push wire from the wire feeder towards the torch. In practice, one of the rollers 48 is mechanically coupled to the motor and is rotated by the motor to drive the wire from the wire feeder, while the mating roller is biased towards the wire to maintain good contact between the two rollers and the wire. Some systems may include multiple rollers of this type. Finally, a tachometer 50 may be provided for detecting the speed of the motor 46, the rollers 48, or any other associated component so as to provide an indication of the actual wire feed speed. Signals from the tachometer are fed back to the control circuitry 36, such as for calibration as described below.

It should be noted that other system arrangements and input schemes may also be implemented. For example, the welding wire may be fed from a bulk storage container (e.g., a drum) or from one or more spools outside of the wire feeder. Similarly, the wire may be fed from a "spool gun" in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Power from the power supply is applied to the wire, typically by means of a welding cable 52 in a conventional manner. Similarly, shielding gas is fed through the wire feeder and the welding cable 52. During welding operations, the wire is advanced through the welding cable jacket towards the torch 16. Within the torch, an additional pull motor 54 may be provided with an associated drive roller, particularly for aluminum alloy welding wires. The motor 54 is regulated to provide the desired wire feed speed as described more fully below. A trigger switch 56 on the torch provides a signal that is fed back to the wire feeder and therefrom back to the power supply to enable the welding process to be started and stopped by the operator. That is, upon depression of the trigger switch, gas flow is begun, wire is advanced, power is applied to the welding cable 52 and through the torch to the advancing welding wire. These processes are also described in greater detail below. Finally, a workpiece cable and clamp 58 allow for closing an electrical circuit from the power supply through the welding torch, the electrode (wire), and the workpiece for maintaining the welding arc during operation.

It should be noted throughout the present discussion that while the wire feed speed may be "set" by the operator, the actual speed commanded by the control circuitry will typically vary during welding for many reasons. For example, automated algorithms for "run in" (initial feed of wire for arc initiation) may use speeds derived from the set speed. Similarly, various ramped increases and decreases in wire feed speed may be commanded during welding. Other welding processes may call for "cratering" phases in which wire feed speed is altered to fill depressions following a weld. Still further, in pulsed welding regimes, the wire feed speed may be altered periodically or cyclically.

Figure 2:
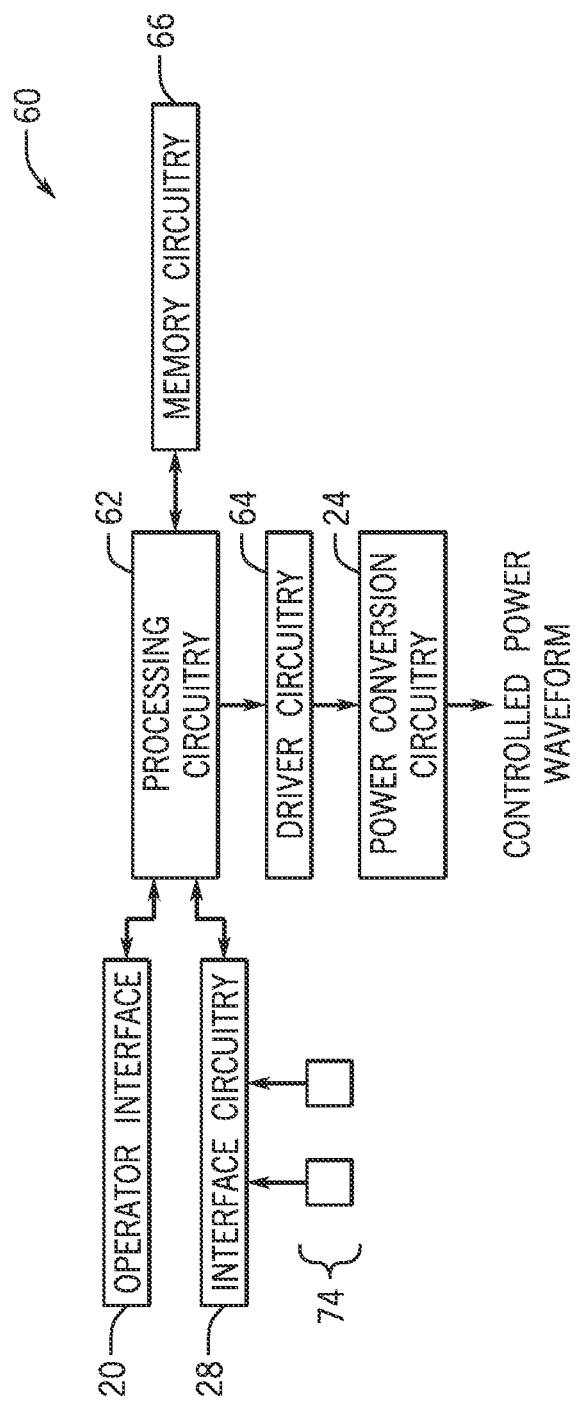
FIG. 2 is a diagrammatical representation of exemplary control circuitry components for a welding power supply of the type shown in FIG. 1.

FIG. 2 illustrates an exemplary embodiment for the control circuitry 22 designed to function in a system of the type illustrated in FIG. 1. The overall circuitry, designated here by reference numeral 60, includes the operator interface 20 discussed above and interface circuitry 28 for communication of parameters to and from downstream components such as a wirefeeder, a welding torch, and various sensors and/or actuators. The circuitry includes processing circuitry 62 which itself may comprise one or more application-specific or general purpose processors, designed to carry out welding regimes, make computations for waveforms implemented in welding regimes, and so forth. The processing circuitry is associated with driver circuitry 64 which converts control signals from the processing to drive signals that are applied to power electronic switches of the power conversion circuitry 24. In general, the driver circuitry reacts to such control signals from the processing circuitry to allow the power conversion circuitry to generate controlled waveforms for pulsed welding regimes of the type described in the present disclosure. The processing circuitry 62 will also be associated with memory circuitry 66 which may consist of one or more types of permanent and temporary data storage, such as for providing the welding regimes implemented, storing welding parameters, storing weld settings, storing error logs, and so forth.

More complete descriptions of certain state machines for welding are provided, for example, in U.S. Pat. No. 6,747,247, entitled "Welding-Type Power Supply With A State-Based Controller", issued to Holverson et al. on Sep. 19, 2001; U.S. Pat. No. 7,002,103, entitled "Welding-Type Power Supply With A State-Based Controller", issued to Holverson et al. on May 7, 2004; U.S. Pat. No. 7,307,240, entitled "Welding-Type Power Supply With A State-Based Controller", issued to Holverson et al. on Feb. 3, 2006; and U.S. Pat. No. 6,670,579, entitled "Welding-Type System With Network And Multiple Level Messaging Between Components", issued to Davidson et al. on Sep. 19, 2001, all of which are incorporated into the present disclosure by reference.

Figure 3:
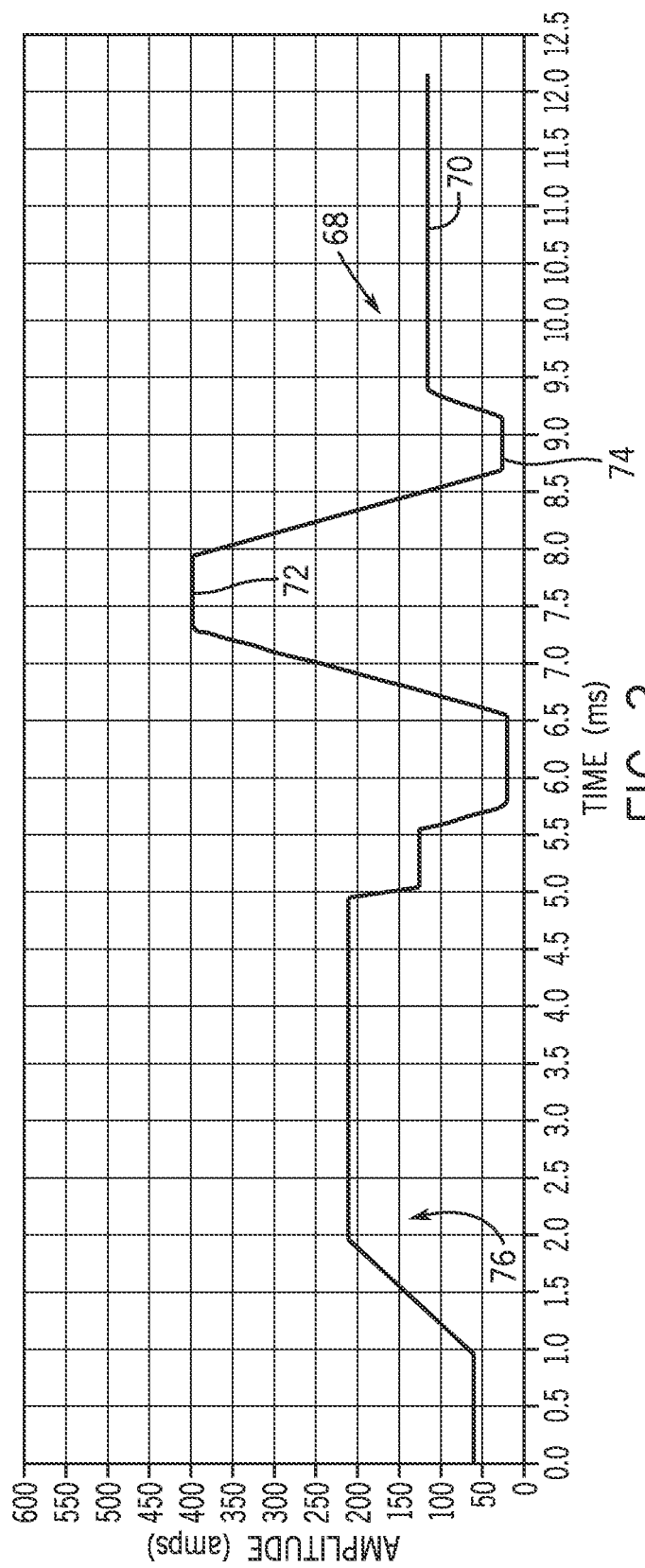
FIG. 3 is a graphical representation of an exemplary waveform for dabbing molten metal from a welding electrode into a weld puddle in accordance with the present techniques.

FIG. 3 generally illustrates an exemplary waveform for a welding technique in which molten metal from the welding electrode is "dabbed" into the weld puddle by controlled reduction of weld current applied to the electrode. In the present context, the term "dab" or "dabbed" or "dabbing" is intended to convey that a relatively hard short is avoided, and that a very brief short circuit may be established once the molten material is already detaching from the electrode and transferring to the weld puddle. The metal is thus transferred without adding excessive energy that might be required if harder or longer term short circuits were employed. In most cycles of the resulting welding process, no special short clearing sequence will be needed, although such sequences may be programmed and ready to be implemented in case a longer or more stubborn short circuit does occur. Once the metal is transferred by the "dab", the arc length is effectively reset, allowing the electrode to "run tighter" or more close to the weld puddle to maintain a short arc. As described below, because the molten material (e.g., a ball of metal) is already detaching after a voltage and/or current peak, little or no current is added to clear the short circuit. The result is a very low voltage arc (i.e., short arc length) and a stable arc with minimum heating of the sheath when cored wires are used.

The waveform shown in FIG. 3, designated generally by reference numeral 68, implements several phases, including a background phase 70, a peak phase 72, and a dabbing (brief short circuit) phase 74. A short clearing routine 76 may be included in case a harder short occurs and additional current is needed to clear the short. However, in many or most cycles of the waveform, this routine may not be needed, further reducing the energy added to the weld and wire.

The waveform 68 shown in FIG. 3 is a current waveform, although, as discussed below with respect to FIG. 4, a voltage waveform exhibits similar behavior and phases. In the exemplary embodiment of FIG. 3, for example, during the background and peak phases, a closed-loop control regime is implemented in which a target voltage is maintained, and current varies to maintain the voltage at the desired levels. During the intermediate ramps, a closed-loop control regime may maintain currents and current ramps at desired levels. The system may thus cyclically transition between current and voltage control to implement the desired waveform.

By way of example, in the waveform illustrated in FIG. 3, during the background phase 70, a current in a range of approximately 25-125 amps (e.g., approximately 115 amps as illustrated in FIG. 3) may be maintained, although again this may vary to meet a desired background voltage level. During the peak phase 72, then, a current in a range of approximately 250-450 amps (e.g., approximately 400 amps as illustrated in FIG. 3) may be maintained, varying again if the voltage is closed-loop controlled. The current during the dabbing phase 74 may be in a range of approximately 15-25 amps (e.g., approximately 25 amps as illustrated in FIG. 3). The durations of these and other phases of the waveform may also be programmed to allow for energy transfer, formation of a molten ball on the electrode, transfer of the ball, and so forth. It should be noted that the particular voltages, currents, and durations implemented may depend upon such factors as the electrode type used, the electrode size, the wire feed speed, the travel speed, and so forth.

It may be noted that the terms "peak", "dabbing", and "background" have been used in the present discussion to convey the phases of the waveform based upon the short "dabbing" phase, as opposed to other pulsed welding regimes. In other programming language, these phases might correspond to "ball", "back", and "pre-short", although those phases in conventional systems are not programmed to implement the low-energy dabbing contemplated by the present techniques.

Figure 4:
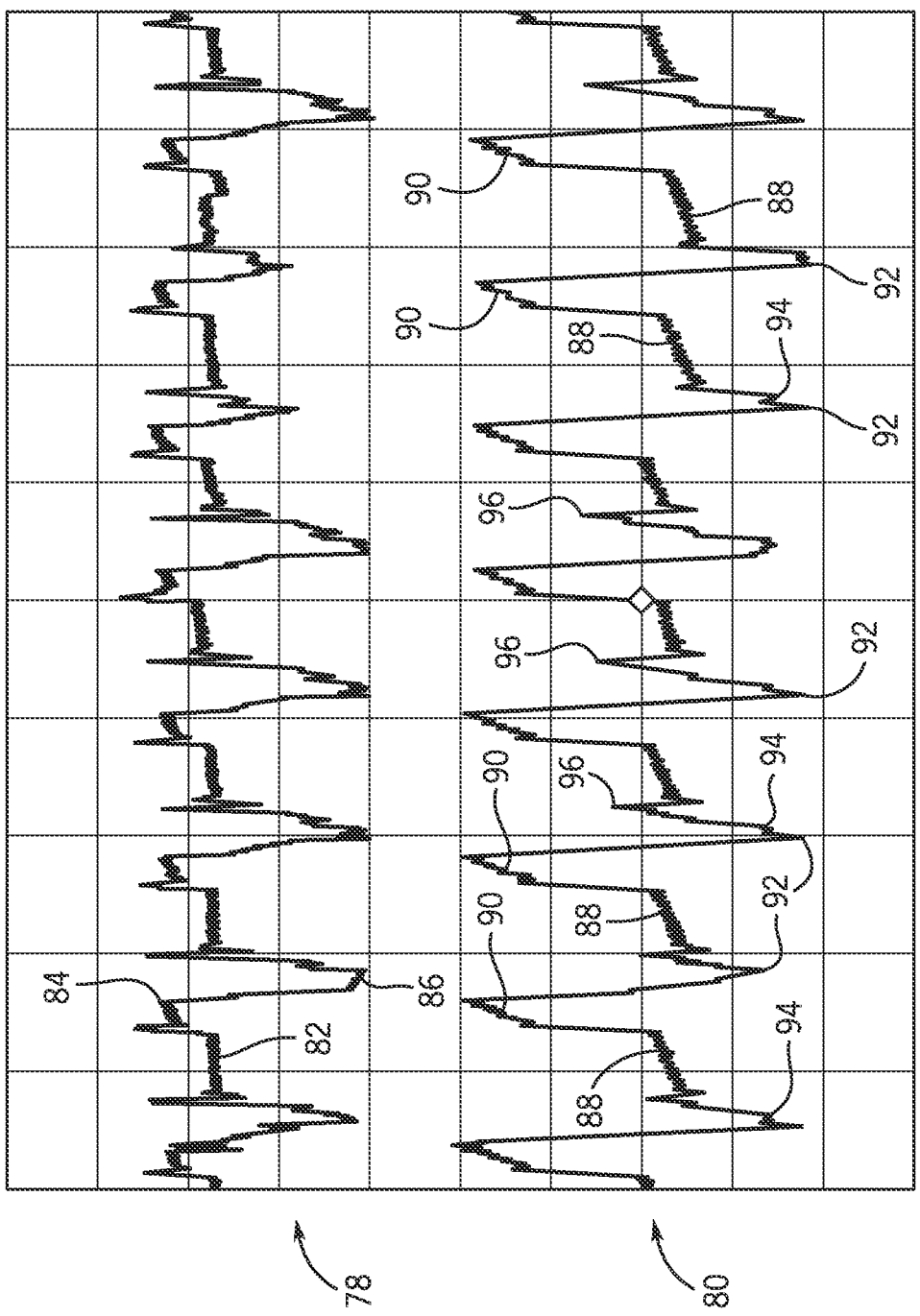
FIG. 4 is a graphical representation of voltages and currents in a series of pulses of such a waveform during an actual implementation.

FIG. 4 illustrates several cycles of a dabbing pulsed waveform based upon programming of the type illustrated in FIG. 3. In FIG. 4, a voltage waveform is indicated by reference numeral 78, while a current waveform is indicated by the reference numeral 80. As can be seen in the voltage waveform, each cycle includes a voltage background 82 during which an arc is ongoing and energy is added to the electrode and weld puddle (and to the surrounding workpiece). This background is followed by a peak 84 during which molten metal created during the background phase is transferred to the weld puddle. In a present implementation, both the background and peak phases are closed-loop voltage controlled, resulting in variation in the current during the corresponding phases, as discussed below. The rapid drop in the voltage, as indicated by reference numeral 86 is indicative of a brief short circuit as the molten metal is transferred to the weld puddle. This phase is generally rapid and a "hard short" may be avoided by using a reduced current target during this time.

On the corresponding current waveform 80, the background phase is indicated by reference numeral 88, while the peak phase is indicated by reference numeral 90. It may be noted that the current does vary during these phases as the system attempts to maintain the target or programmed voltage. As noted above, then, a reduced dabbing current target is used to deposit the molten ball in the weld puddle with reduced energy input, as indicated by reference numeral 92. In certain cycles, a "wet" phase 94 may be implemented to assist in clearing the short circuit. Moreover, in cycles when short circuits do not easily clear, a more elevated current may be used to force the short circuit to clear, as indicated by reference numeral 96.

It should be noted that in the waveforms illustrated in FIGS. 3 and 4, the resulting "dabbing" regime differs from conventional short circuit welding waveforms. In particular, in conventional welding regimes a peak phase is followed by a "knee" in which the current is maintained at a level above the subsequent background level. The knee may aid in avoiding short circuits, if desired. If not desired, the knee may be reduced in duration and the waveform may return more quickly to the background level.

In the present technique, on the other hand, a current lower than the background current level is targeted immediately after the peak phase. For example, while the background current level may be on the order of 25-125 amps, the dabbing current may be less than approximately 25 amps, for example, on the order of 15-25 amps. The duration of the dabbing may be very short, such as on the order of 1-5 ms. This reduced current allows the short circuit transfer of the molten ball with the addition of very little energy, thus avoiding overheating the electrode. The arc length is thus reset and excessive stickout and flaring of the arc are avoided.

Figure 5:
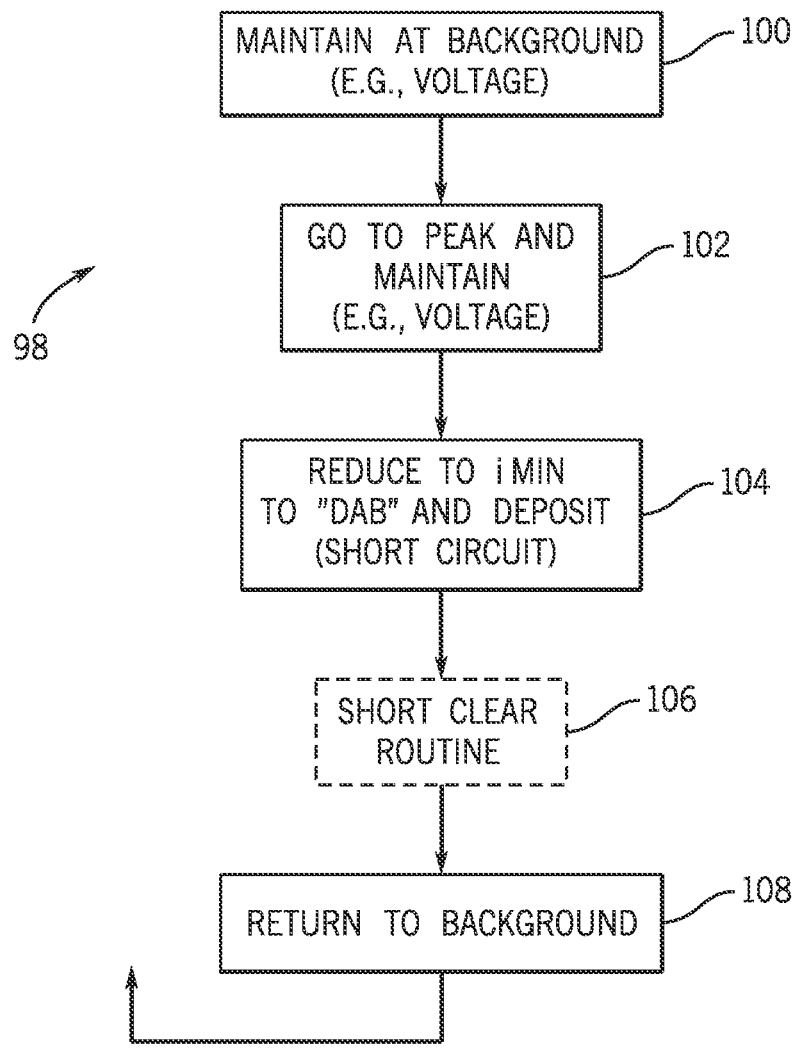
FIG. 5 is a flow chart illustrating certain control logic in implementing such a welding regime.

FIG. 5 illustrates exemplary control logic for implementing the dabbing regime. The logic, indicated generally by reference numeral 98, is cyclical, but may be considered to begin with maintaining the background phase (constant voltage in a current implementation), as indicated by reference numeral 100. During this phase the arc is established and energy is added to the electrode and weld puddle. Then the peak phase is implemented (again a constant voltage in the current implementation), as indicated by reference numeral 102. This phase does the majority of the detachment of the molten metal (i.e., the molten ball is being pushed off the end of the wire due to the arc force generated by the high currents), but the ball does not generally detach during this phase (but remains attached by a trailing tail). The ball detaches during the short that follows in the dabbing phase, but because the ball is already extended away from the end of the electrode, little or no additional energy is required to remove the short circuit. At step 104, the current is reduced to the target minimum to dab the molten ball into the weld puddle with the addition of very little energy. If needed, a short circuit routine may be implemented, as indicated by reference numeral 106, as when the current and voltage levels indicate that a short circuit persists and did not clear following the dabbing current. At step 108, then, the control returns to the background levels, and the cycle may be repeated.

It should be noted that in some implementations the dabbing may be performed in different ways than by a low current target following the peak phase. For example, an output short circuit may be created via a switch to quickly reduce the current between the electrode and the workpiece and weld puddle. Similarly, the output power may be switched off for a short duration following the peak phase in order to extinguish the arc or at least to add little or no energy.

Figure 6:
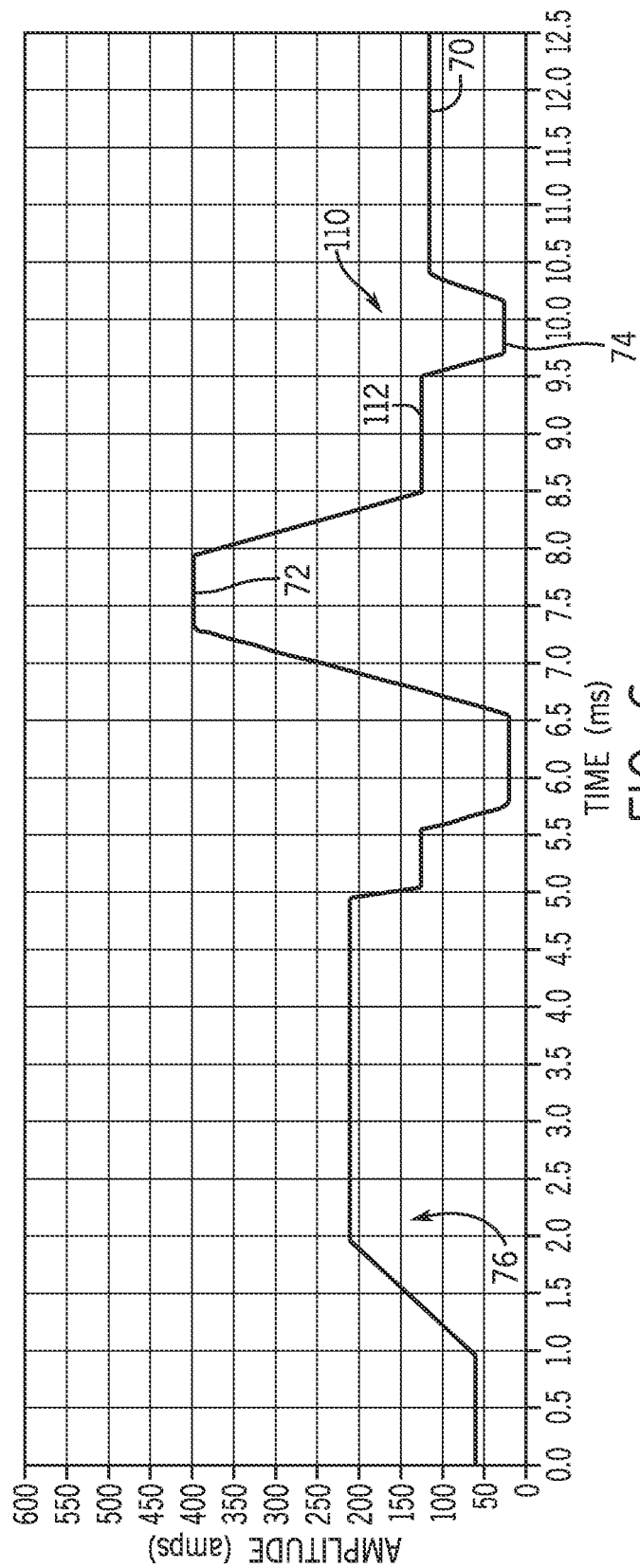
FIG. 6 is a graphical representation of another exemplary waveform for dabbing molten metal from a welding electrode into a weld puddle in accordance with the present techniques.

As mentioned above with respect to FIGS. 3 and 4, certain embodiments described herein differ from conventional pulsed welding waveforms in that a knee phase (at a current level higher than the background current level) immediately after the peak phase may be avoided. However, as also mentioned above, one or more knee phases may be used in certain embodiments. For example, FIG. 6 generally illustrates an exemplary waveform 110 that is similar to the waveform illustrated in FIG. 3, but that includes one or more knee phases 112 immediately after the peak phase 72 but before the dabbing phase 74. As such, the peak phase 72 is followed by the one or more knee phases 112, and then the short may be forced with the dabbing phase 74 followed by one or more background phases 70. Although illustrated as having only one knee phase 112 and only one background phase 70 in FIG. 6, it will be appreciated that more than one knee phase 112 and/or more than one background phase 70 may be utilized in certain embodiments. In general, the one or more knee phases 112 will have a current level higher than the one or more background phases 70 but lower than the peak phase 72. For example, the knee phase 112 illustrated in FIG. 6 is at a current level of approximately 125 amps while the background phase 70 is at a current level of approximately 115 amps and the peak phase 72 is at a current level of approximately 400 amps. In other embodiments, the one or more knee phases 112 may have a current level in a range of approximately 125-250 amps as long as the current level remains above the current levels of the one or more background phases 70.

Figure 7:
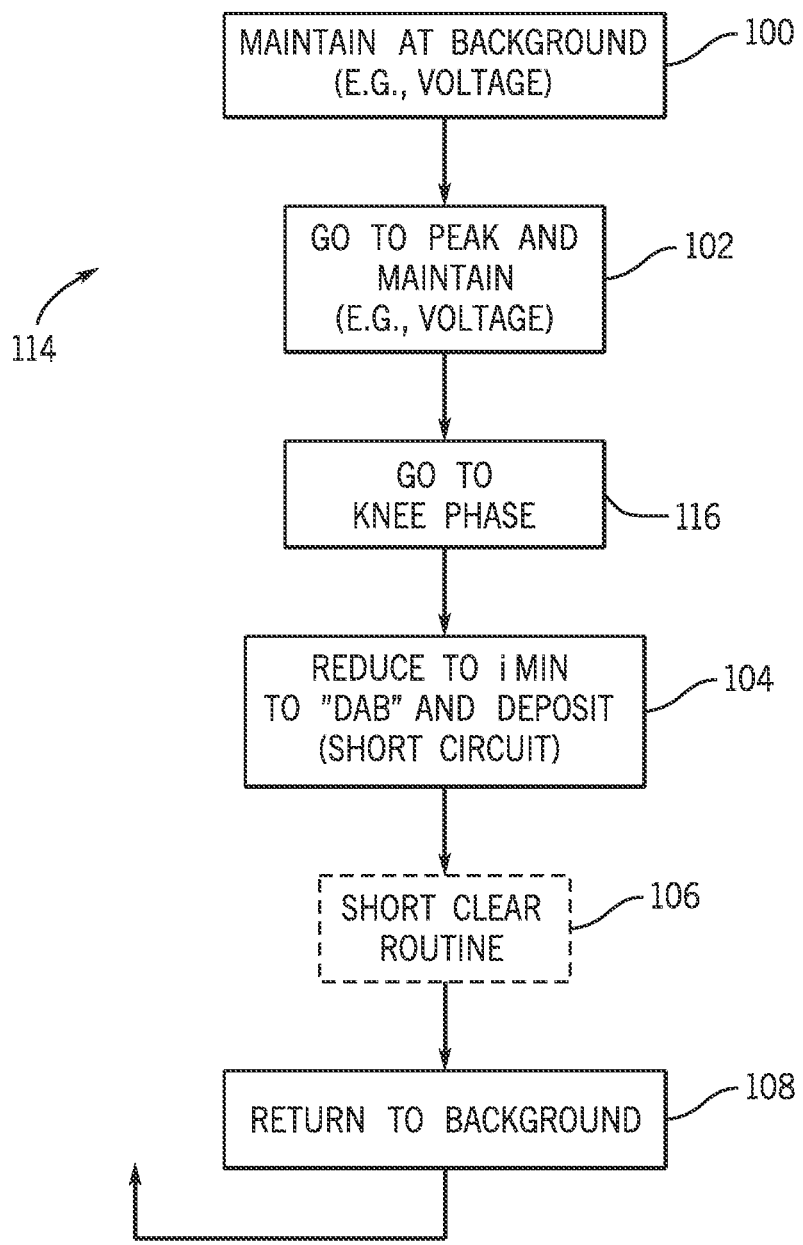
FIG. 7 is a flow chart illustrating certain control logic in implementing the welding regime of FIG. 6.
Figure 8:
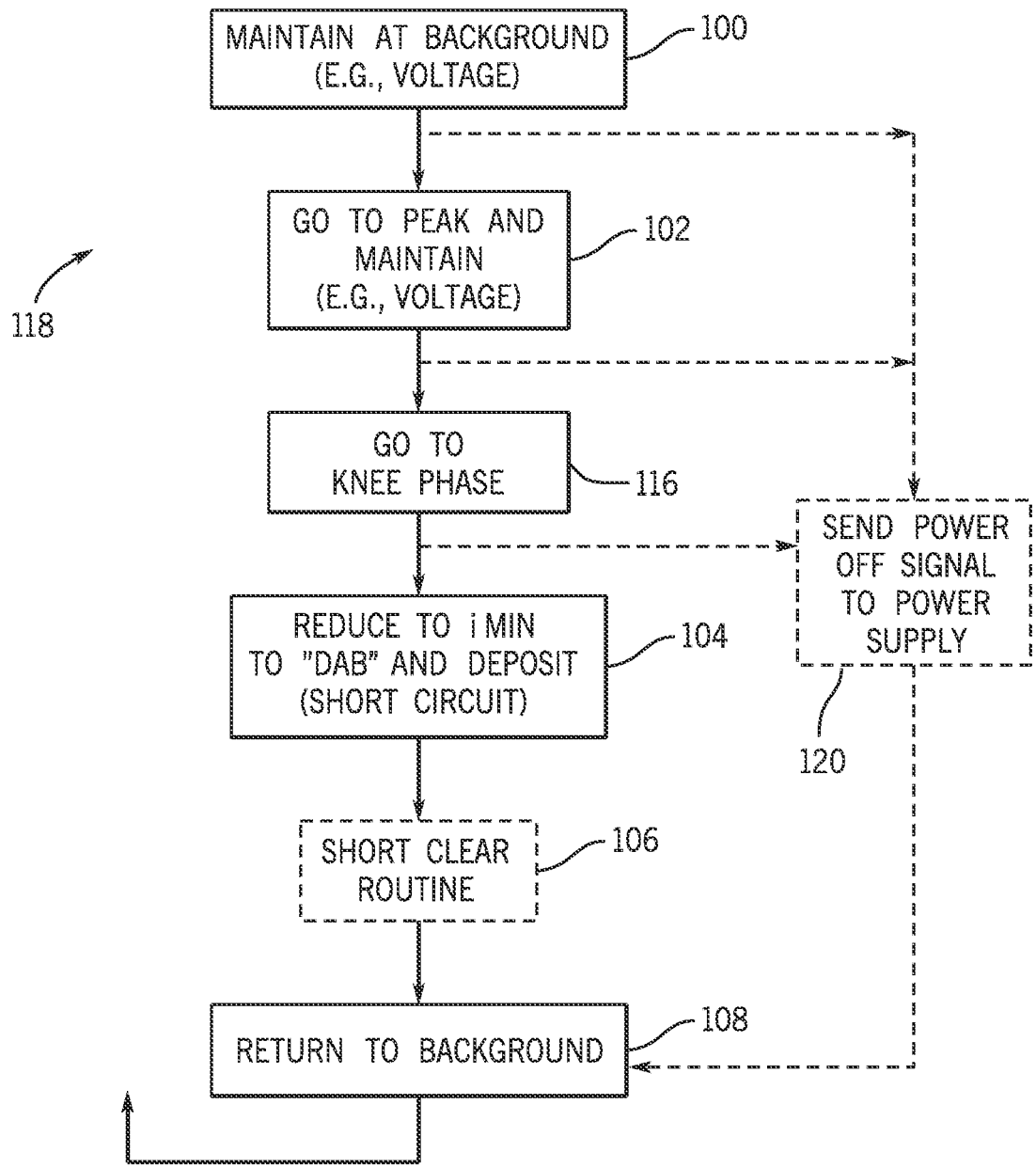
FIG. 8 is a flow chart illustrating certain control logic that generates a power off signal in accordance with the present techniques.

FIG. 7 illustrates exemplary control logic for implementing the dabbing regime of FIG. 6. The logic, indicated generally by reference numeral 114, is substantially similar to the logic 98 illustrated in FIG. 5 but with an additional step 116 of having one or more knee phases 112 in between the peak phase 72 and the dabbing phase 74. In certain embodiments, the peak phase 72, knee phase 112, or dabbing phase 74 may be replaced with a power source off signal. In particular, the power supply 10 may be turned off by dropping the current command to zero (or a very low command level such as approximately 1-2 amps or even lower than 1 amp), by disabling an engine driving the power supply 10, or by turning off a power source gate signal of the power supply 10. Any one of the steps of the logic 114 illustrated in FIG. 7 relating to the peak phase 72 (e.g., step 102), the one or more knee phases 112 (e.g., step 116), or the dabbing phase 74 (e.g., step 104) may be replaced with the step of extinguishing the arc by disabling the power supply 10. For example, FIG. 8 illustrates exemplary control logic 118 for bypassing any one of these steps to instead send a power off signal to the power supply 10. In certain embodiments, once the arc has been extinguished, a relatively small current (e.g., approximately 1-2 amps or even lower than 1 amp) may be applied, re-enabling the power supply 10 and reigniting the arc, followed by one or more background phases 70 (e.g., returning to step 108 of the logic 118). In certain embodiments, once extinguishment of the arc has been initiated, the voltage may be monitored for a short (because the arc may hold for a few milliseconds due to capacitance and inductance) and, once the arc has been extinguished, the relatively small current (e.g., approximately 1-2 amps or even lower than 1 amp) may be applied, re-enabling the power supply 10 and allowing for monitoring of voltage for detection of a short circuit.

Figure 9:
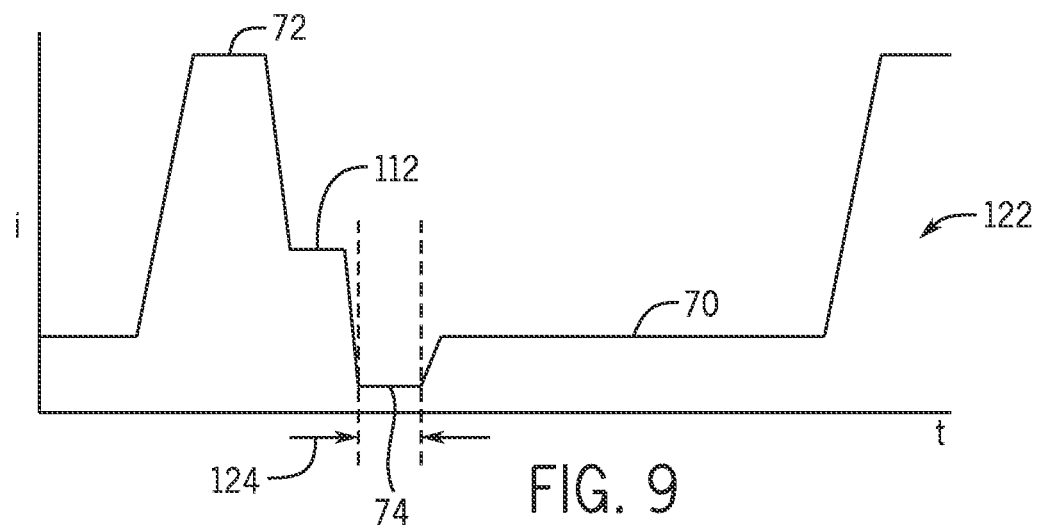
FIGS. 9, 10 and 11 are graphical representations of exemplary alternative welding waveforms implementing dabbing phases in accordance with aspects of the techniques.
Figure 10:
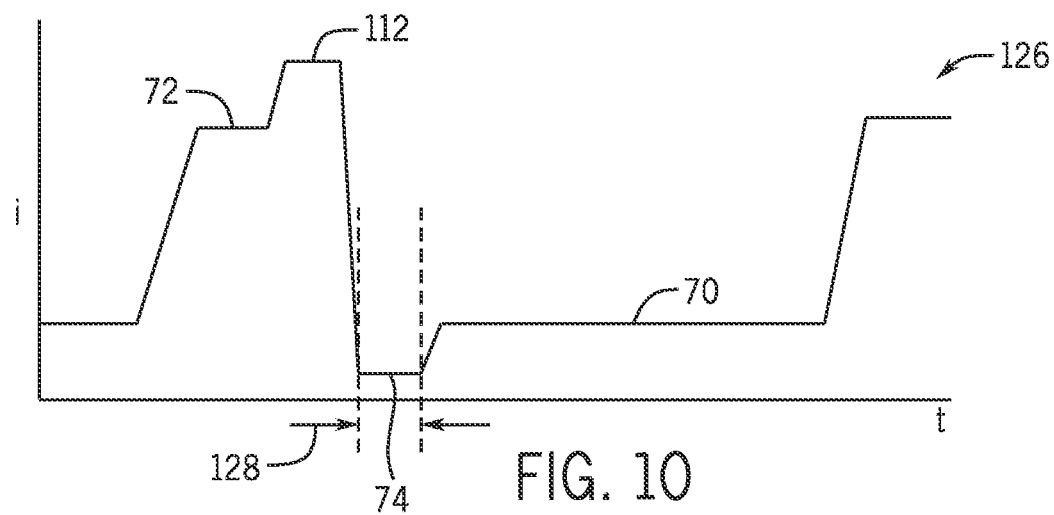
Figure 11:
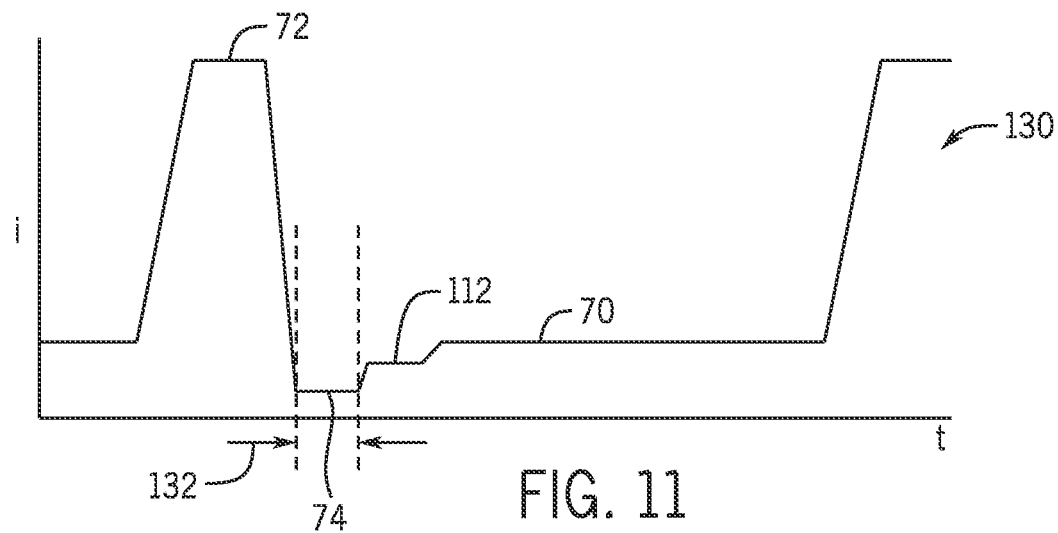

FIGS. 9, 10, and 11 illustrate alternative waveforms for welding regimes that implement the dabbing technique summarized above. As shown in FIG. 9, in a first alternative 122, the peak phase 72 may be followed by a reduced current knee 112, that is then followed by a dabbing phase 74. Generally, the dabbing phase will then be followed by one or more background phases 70 before the waveform returns to the peak phase. In this embodiment it should be noted that the knee phase is considered optional. That is, the basic programmed control regime for the pulsed welding operation may omit the knee phase altogether, or different durations or current levels of such knees may be implemented. Where handled programmatically, the basic pulsed waveform program may include one or more knee phases, each of which may be programmed to a zero duration to eliminate them from the control logic implemented. Alternatively the control circuitry may sometimes utilize a knee phase, and at other times not utilize the knee phase. Also shown in FIG. 9, the dabbing phase 74 has a duration 124 that is determined by the onset and termination of this phase. The particular type and timing of the termination may vary, and several presently contemplated options are discussed below with respect to FIG. 12.

FIG. 10 similarly shows a waveform 126 that includes a peak phase 72, but that is followed by an elevated current knee 112, itself followed by a dabbing phase 74 and then one or more background phases 70. Here again, the knee should be considered optional, and may be programmed and controlled in manners similar to those discussed above with respect to waveform 122 of FIG. 9. Also, here the dabbing phase has a duration 128 that is again determined by its onset and termination, which may follow any of the options outlined below with reference to FIG. 12. Still further, FIG. 11 illustrates a welding waveform 130 comprising a peak phase 72 that is immediately followed by a dabbing phase 74. This dabbing phase is then followed by a knee 112 that may be again considered as optional (and programmed and controlled as such), and one or more background phases 70. The duration 132 of the dabbing phase 74 is again determined by the onset and termination of this phase.

Figure 12:
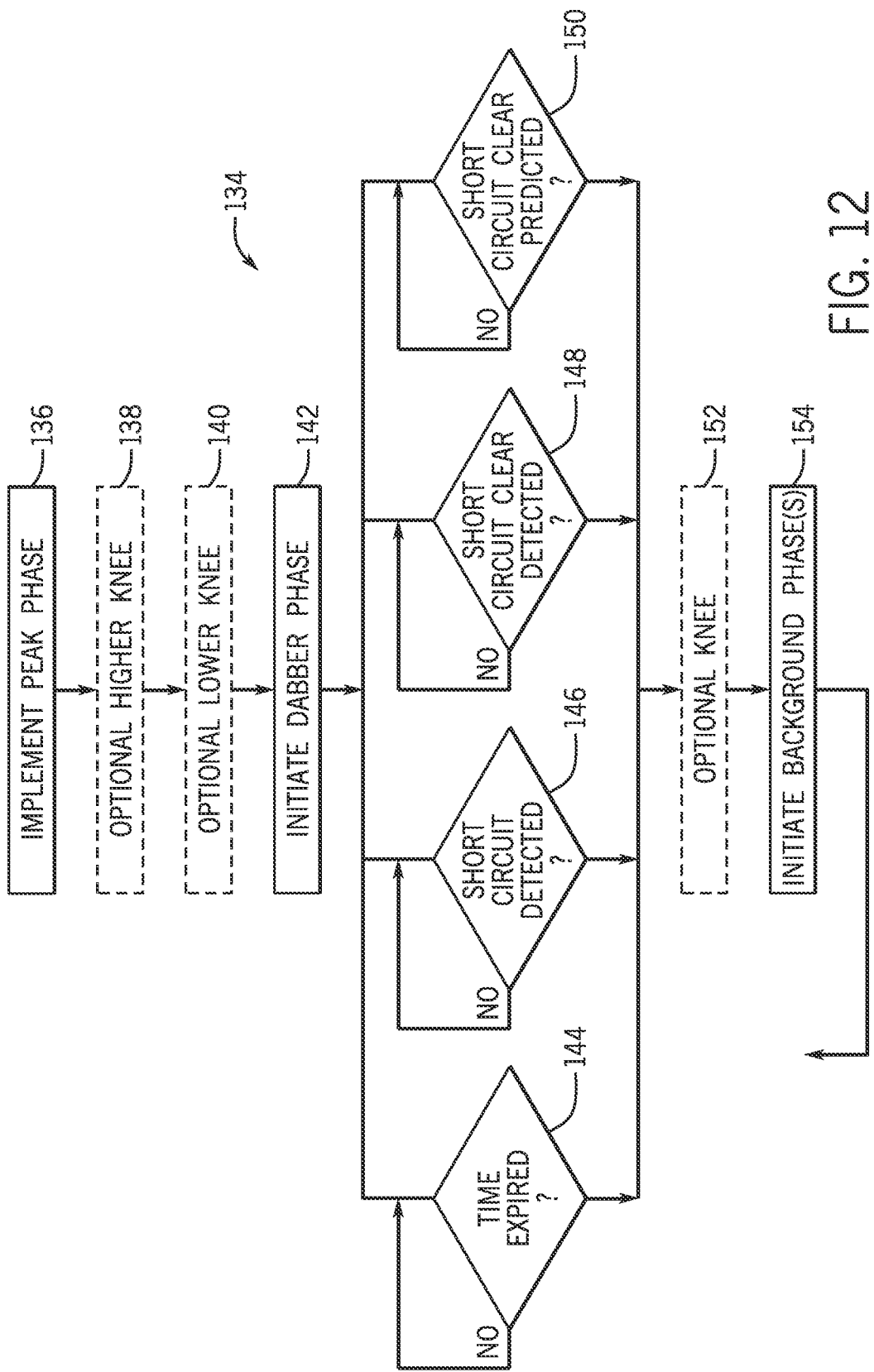
FIG. 12 is a flow chart illustrating exemplary control logic for implementing a welding regime with dabbing phases and optional knee phases, and also with options for exiting the dabbing phases.

FIG. 12 sets forth exemplary control logic for utilizing optional knee phases in a pulsed welding regime that utilized dabbing phases, as well as certain presently contemplated options for exiting the dabbing phase. The logic 134 may be considered to begin with implementation of the peak phase, as indicated by reference numeral 136. This peak phase may then be followed by a higher current knee, as indicated by step 138 (see, e.g., FIG. 10) and/or a lower current knee, as indicated by step 140 (see, e.g., FIG. 9). Here again, these knee phases may be considered as optional insomuch as they may be programmatically included or eliminated, or may be included in the control regime but their parameters (e.g., levels and durations) determined during the welding operation.

At step 142 the dabbing phase is initiated as discussed above. Termination of this dabbing phase (and therefor its duration) may follow one or more optional techniques, however. As indicated by step 144, the dabbing phase may simply be timed so that current is increased to exit the dabbing phase after expiration of a pre-set time. This type would generally be programmed into the control regime, such as based on known welding performance for certain wires, current levels, and so forth. In this option, once the set duration expires, the system raises the current to the next programmed level.

At step 146, however, the dabbing phase could be exited upon detection of a short circuit between the welding electrode and the workpiece. Such short circuits may be determined, for example by monitoring weld current, which will tend to spike upon the occurrence of a short circuit, or weld voltage, which will tend to drop as the electrode (or its molten tip) and the weld puddle come close and ultimately touch. Here the dabbing phase would continue until the system detects such short circuiting, and then the next phase of control would be implemented to raise the current.

At step 148, in another alternative, the dabbing phase may ride through such short circuits, and the control circuitry may exit the dabbing phase when it detects that the short circuit has likely cleared. Such clearing may be determined by reference, for example, to a rising weld voltage (as the electrode material separates from the weld puddle) or by a tendency for the weld current to drop (indicating the conductive path resulting form the short circuit is being interrupted). The control regime would then move to the next phase.

At step 150, similarly, the dabbing phase may be terminated based upon a prediction of short clearing. A number of factors may be monitored for such predications, such as a rate of change of voltage (e.g., at least one of first and/or second time derivatives), a rate of change of current, a rate of change of power, or any other reference that tends to indicate that the short circuit established in the dabbing phase has not yet cleared but will soon clear.

While these possible dabbing phase terminating approaches have been presented in the alternative, it should be understood that all of some of them (and indeed others) may be programmed into the basic regime, and then implemented by selection by the weld engineer, product designer, or even the user. Similarly, some of these may be used together (e.g., exiting dabbing upon occurrence of the earlier of a short clear or a timeout). Moreover, in practice, the timing and duration of the dabbing phase may change, including between cycles, and in likelihood would change if the termination of this phase is a function of anything other then a fixed time.

In the illustration of FIG. 12, once the dabbing phase is terminated, an optional knee may be implemented, as indicated as step 152 (see, e.g., FIG. 11). Thereafter, the one or more background phases will be implemented as indicated at step 154, before returning to the peak phase at step 136.

It should also be noted that various further alternative approaches are available utilizing the dabbing phase techniques discussed above. For example, in one presently contemplated embodiment, the dabbing phase could be initiated by external circuitry 25 (that is, external to the welding power supply and/or the power supply control circuitry), as shown in the example of FIG. 1. Such circuitry could serve to short the output of the power supply 10 and/or to extract energy or power from the welding arc to create the dabbing phase. In a further alternative, the welding power supply 10 itself could be placed in a passive, non-powering, or even non-powered state during the dabbing phase. This could be accomplished by appropriate control of the power conversion circuitry 24 under the regulation of the control circuitry 22 of the power supply 10 (or external circuitry 25).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding method comprising:
    generating a control waveform for welding power output from a welding power supply, the waveform comprising at least one peak phase followed by a first knee phase and a dabbing phase followed by a second knee phase and at least one background phase, wherein an energy level of the welding power output transitions from a peak energy level to a dabbing energy level to command a short circuit between a welding electrode and a workpiece to occur during the dabbing phase based on the control waveform;
    initiating transition to the dabbing phase from the peak phase via external circuitry external to the welding power supply, the external circuitry configured to short the welding power output of the welding power supply to create the dabbing phase;
    converting incoming power to welding power based upon the control waveform, such that the dabbing energy level is less than the peak energy level, a background energy level and first and second knee phase energy levels, wherein the first knee phase energy level is greater than the background energy level, and the second knee phase energy level is lower than the background energy level; and
    terminating the dabbing phase based upon determination of clearance of the short circuit.

2. The method of claim 1, wherein during the background phase the welding power output has a current level of between approximately 25 amps and approximately 125 amps.

3. The method of claim 2, wherein during the dabbing phase the welding power output has a current level of less than approximately 25 amps.

4. The method of claim 1, wherein the dabbing phase has a duration of between approximately 1 millisecond and approximately 5 milliseconds.

5. The method of claim 1, further comprising beginning to detach a ball of molten metal from a welding electrode during the peak phase, and establishing the short circuit during the dabbing phase wherein the ball detaches and the short is cleared during the dabbing phase.

6. The method of claim 1, further comprising resetting an arc length between an end of a welding electrode and a weld puddle into which a ball of molten metal is deposited during the dabbing phase.

7. The method of claim 1, wherein during the peak and background phases the welding power output is closed-loop controlled to maintain target voltages.

8. A welding method comprising:
    generating a cyclical control waveform for welding power output, the waveform comprising, in each cycle and in the following order, a peak phase, a first knee phase, a dabbing phase, a second knee phase and a background phase, wherein an energy level of the welding power output transitions from a peak energy level to a dabbing energy level to command a short circuit between a welding electrode and a workpiece to occur during the dabbing phase based on the control waveform;
    initiating the dabbing phase by extracting power from a welding arc to transition from the peak phase to create the dabbing phase;
    converting incoming power to welding power based upon the control waveform, such that the dabbing energy level is less than the peak energy level, a background energy level and first and second knee phase energy levels, wherein the first knee phase energy level is greater than the background energy level, and the second knee phase energy level is lower than the background energy level;
    establishing the short circuit during the dabbing phase;
    detaching a ball of molten metal to clear the short circuit during the dabbing phase; and
    terminating the dabbing phase based upon determination or prediction of the clearance of the short circuit.

9. A welding system comprising:
    control circuitry configured to generate a control waveform for welding power output, the waveform comprising a peak phase followed by a first knee phase and a dabbing phase followed by a background phase, wherein an energy level of the welding power output transitions from a peak energy level to a dabbing energy level to command a short circuit between a welding electrode and a workpiece to occur during the dabbing phase based on the control waveform; and
    power conversion circuitry configured to:
        initiate the dabbing phase by controlling the welding power output to enter a non-powered state during the dabbing phase;
        convert incoming power to welding power based upon the control waveform, such that the dabbing energy level is less than the peak energy level, a background energy level and a first knee phase energy levels, wherein the first knee phase energy level is greater than the background energy level; and
        terminate the dabbing phase based upon determination of clearance of the short circuit.

10. The system of claim 9, wherein the control waveform comprises a cyclical waveform further comprising, in each cycle and in the following order, the peak phase, the first knee phase, the dabbing phase, a second knee phase and the background phase.

11. The method of claim 1, wherein determination of clearance of the short circuit is based on a rising weld voltage or a drop in weld current.

12. The method of claim 1, wherein the control waveform transitions from the peak energy level to the dabbing energy level prior to establishing the short circuit.

13. The method of claim 1, further comprising increasing the current to force clearance of the short circuit.

14. The method of claim 1, wherein the external circuitry is configured to extract energy or power from a welding arc to initiate the dabbing phase.

15. The method of claim 8, wherein the generating is controlled by power conversion circuitry of a welding power supply, and wherein the initiating is controlled by external circuitry external to the welding power supply.

16. The system of claim 9, further comprising external circuitry configured to extract energy or power from a welding arc to initiate the dabbing phase.

* * * * *